UNITED STATES PATENT OFFICE.

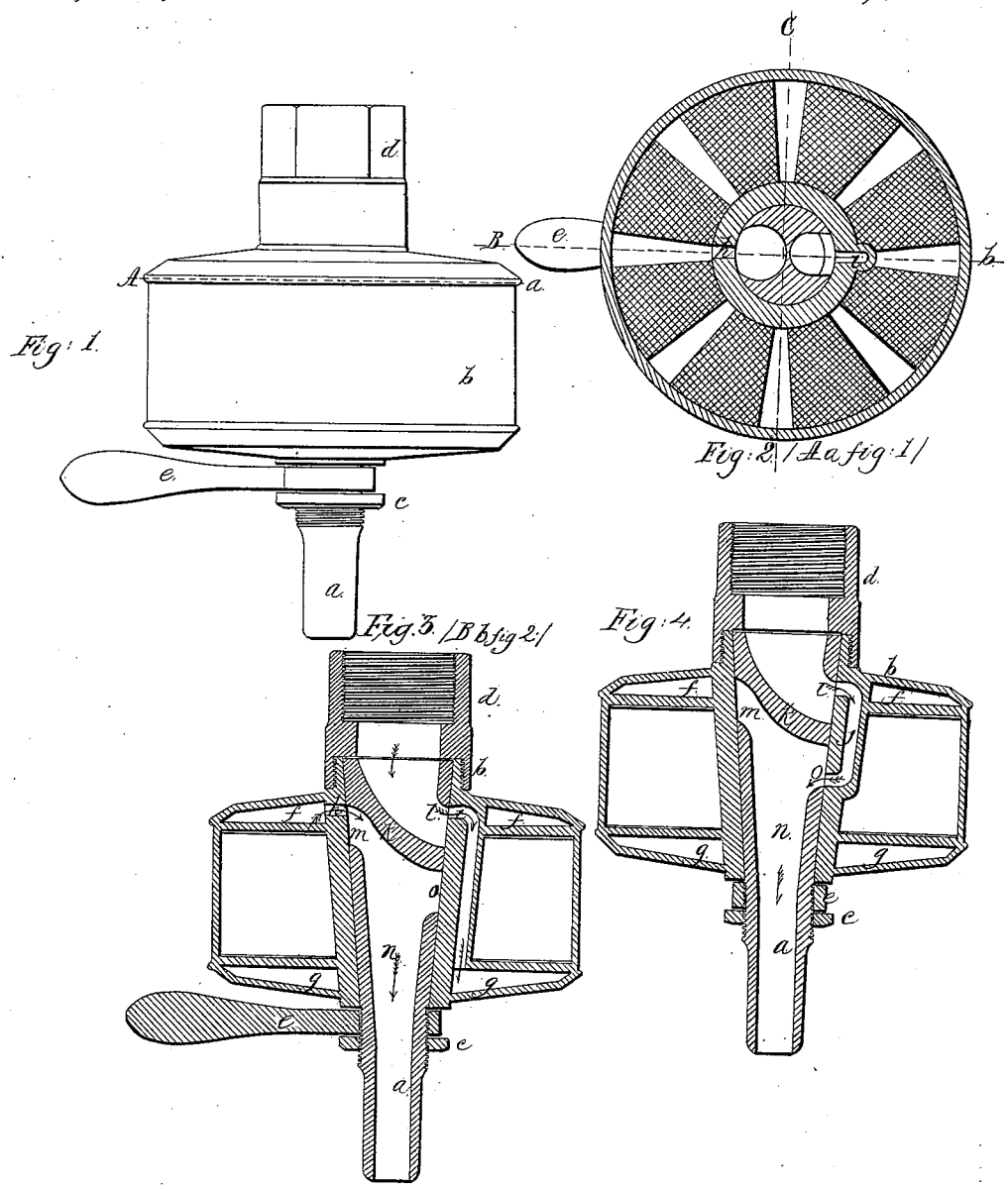

ABRAHAM JOHNSON AND HENRY JOHNSON, OF NEW YORK, N. Y.

STOP-COCK AND FILTER IN COMBINATION.

Specification of Letters Patent No. 6,910, dated November 27, 1849.

*To all whom it may concern:*

Be it known that we, ABRAHAM JOHNSON and HENRY JOHNSON, of the city, county, and State of New York, have invented new and useful Improvements in Filtering Cocks, and that the following is a full, clear, and exact description of the principle or character which distinguishes them from all other things before known and of the manner of making, constructing, and using the same, reference being had to the accompanying drawings, making part of this specification, in which—

Figure 1, is an elevation of our improved filtering cock; Fig. 2, a horizontal section taken at the line (A *a*) of Fig. 1; Figs. 3 and 4, vertical sections taken at the lines (B *b*) and (C *c*) of Fig. 2.

The same letters indicate like parts in all the figures.

In a filtering cock secured to us by Letters Patent bearing date the 14th day of Nov'r 1848, for the purpose of drawing filtered or unfiltered water and reversing the filtering action, the change in the direction of the currents of water is effected by a two way cock with a conical end, fitted to and turning at the lower end of the central pipe of the filter. To avoid in part the complexity and cost of construction of this arrangement and the difficulty of keeping the joints tight, is the main object of our present improvement, which consists in effecting the change in the direction of the current, to draw either filtered or unfiltered water, and reversing the filtering action, by simply turning the filter on the discharge water pipe to which it is fitted, the said discharge water pipe being made with a water delivery passage which runs down the body of the pipe and then runs out laterally at some point between the top of the filtering medium and the top of the case forming the first lateral passage, and with another passage which extends up from the delivery aperture and branches out laterally on opposite sides, one called the second lateral aperture, on the same level with but opposite to the first lateral aperture, and the other on the same side but a little below it, called the third lateral aperture, when this arrangement of water passages is and apertures is combined with two apertures in the inner periphery of the filter and on the same level but on opposite sides, one communicating with the upper chamber and the other with the lower chamber, and with a recess in the said inner periphery of the filter, so that when the filter is turned in one position the first lateral aperture delivers the water, so that one of the apertures of the filter which communicates with the lower chamber, thence it passes up through the filtering medium and out through the second lateral to the discharge pipe; and when the said filter is turned to bring the recess in connection with the second and third lateral apertures the water passes to this recess from the first lateral and thence through the third lateral aperture to the discharge pipe.

In the accompanying drawings (*a*) represents a central pipe of a conical form and fitted to a central hole in the case (*b*) of a filter, and drawn down tight to make a water joint by means of a collar nut (*c*) tapped onto the lower end of the central pipe and bearing against the bottom plate of the filter case, so that by the conical form of the central pipe and the nut the joint can always be kept water tight.

The top of the filter case is provided with a coupling nut (*d*) to form the connection of the apparatus with a water pipe, but instead of this the central pipe may be a continuation of such water pipe. When the filter case is coupled to the water pipe the central pipe must be adapted to receive a key (*e*) by which to turn it when desired for drawing either filtered or unfiltered water, and when the central pipe is made a continuation of the water pipe then the filter itself must be turned for drawing water.

The inside of the filter is divided into two chambers an upper one (*f*) and a lower one (*g*) by means of a diaphragm made of any filtering medium. A hole or aperture (*h*) forms a communication between the upper chamber (*f*) and the central pipe and the lower chamber (*g*) also communicates with the central pipe by means of a channel and aperture (*i*) opposite to the one (*h*) and on the same level. The inner periphery of the filter case is made with a recess (*j*) between the apertures (*h*) and (*i*) the upper end of which is on the same level but extending lower down.

The central pipe (*a*) has a water passage (*k*) at the upper end which is a continuation of the water pipe, and this passes out at the side forming what we term the first lateral aperture (*l*), and opposite to this is a second lateral aperture (*m*) which runs to the delivery passage (*n*) through which the water is discharged, and finally this discharge passage has another lateral aperture (*o*) called the third lateral aperture situated on the same side with, and below the first lateral aperture.

It will be seen from the foregoing that when the first and third lateral apertures (*l*, *o*) are in connection with the recess (*j*) that the water will pass from the water pipe through the lateral passage (*l*) to the recess (*j*) thence through the passage (*o*) to the delivery aperture of the central pipe, and will thus be delivered without being filtered; but when either the filter or central pipe is turned so that the lateral aperture (*l*) communicates with the hole (*i*) of the lower chamber (*g*), the lateral passage (*m*) will also be in connection with the hole or passage (*h*) of the upper chamber (*f*) and therefore the water will pass from the water pipe through the lateral passage (*l*) and hole (*i*) to the lower chamber (*g*) thence through the filtering medium and out through the hole (*h*) of the upper chamber and lateral passage (*m*) to the delivery aperture of the central pipe, thus delivering filtered water, and when it is desired to reverse the filtering action either the filter, or the central pipe must be turned half way round so that the hole (*h*) of the upper chamber (*s*) shall communicate with the lateral passage (*l*) and the lateral passage (*m*) with the hole (*i*) of the lower chamber (*g*), and then the water will pass through the lateral aperture (*l*) and hole (*h*) to the upper chamber thence down through the filtering medium to the lower chamber and thence through the hole (*i*) and lateral passage (*m*) to the delivery pipe. In any other position than those described the passage of the water will be cut off.

What we claim as our invention and desire to secure by Letters Patent is—

An improvement on the filtering cock secured to us aforesaid is the arrangement of the water passages in the central pipe in combination with the filters having two chambers with a water passage leading from each chamber, and a recess, substantially as herein described, whereby filtered and unfiltered water can be drawn, and the filtering action reversed, as described.

ABRAHAM JOHNSON.
HENRY JOHNSON.

Witnesses:
A. P. BROWNE,
EDW. A. PETERS.